No. 796,125. PATENTED AUG. 1, 1905.
H. P. JOSEWSKI.
LUBRICATOR.
APPLICATION FILED DEC. 12, 1904.

Witnesses:— Inventor
F. C. Fliedner Henry P. Josewski
By Geo. H. Strong.
Atty.

UNITED STATES PATENT OFFICE.

HENRY P. JOSEWSKI, OF SAN FRANCISCO, CALIFORNIA.

LUBRICATOR.

No. 796,125. Specification of Letters Patent. Patented Aug. 1, 1905.

Application filed December 12, 1904. Serial No. 236,497.

*To all whom it may concern:*

Be it known that I, HENRY P. JOSEWSKI, a citizen of the United States, residing in the city and county of San Francisco, and State of California, have invented new and useful Improvements in Lubricators, of which the following is a specification.

My invention relates to a device which is especially designed to supply a measured amount of lubricant to bearings with which it may be connected.

It consists in the combination and arrangement of parts and in details of construction, which will be more fully explained by reference to the accompanying drawings, in which—

Figure 1:
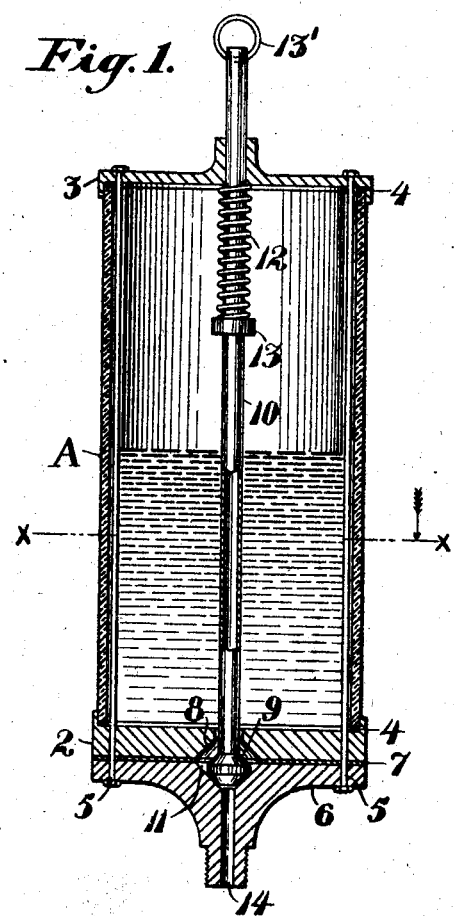
Figure 2:
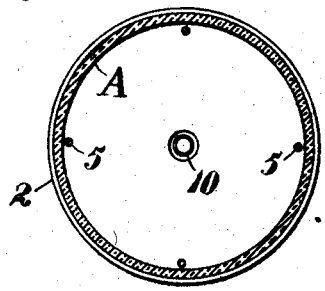

Figure 1 is a vertical central section of my device. Fig. 2 is a section on line $xx$ of Fig. 1.

Lubricators such as are connected with line and counter shafting and other places, and especially places which are somewhat inaccessible, are difficult to regulate, so that either too little or too much lubricant will be supplied.

It is the object of my invention to provide a device by which a stated amount of lubricant will be supplied to the bearing or part and without danger to the operator by reason of getting into the way of running belts or moving machinery.

As shown in the drawings, A represents a container, which in the present case is preferably composed of a glass cylinder having metal ends 2 and 3, chambered or formed with flanges within which the ends of the cylinder fit, and having washers to insure tight joints at these ends, as shown at 4. These parts may all be securely held together by rods, as at 5, these rods passing through the end plates and interior to the cylindrical portion, having heads and nuts, respectively, at the ends by which the parts may be drawn and held together.

Beneath the lower head is a part 6, which in the present case is shown substantially of the same peripheral size as the part 2 and clamped thereto by the bolts 5. An intervening washer 7 at this point prevents leakage between the two parts 2 and 6. These parts are both chambered, the part 2 having its chamber made in the bottom and, as here shown, substantially funnel-shaped, as at 8, to provide a suitable support for the upper portion of a valve 9, which is carried upon the stem 10, this stem passing centrally through the top and bottom of the lubricating-cup, as shown. The lower part 6 has a correspondingly-shaped seat, as at 11, and this seat is adapted to receive the lower end of the valve 9, which in the present case is shown as double convex in shape, so that either end may be properly closed upon its seat, as 8 or 11.

The stem 10 may have a coil-spring, as 12, surrounding its upper part and pressing against the collar 13 with sufficient force to normally close the valve against the lower seat 11, thus leaving the upper part of the valve-chamber of sufficient size to receive oil which will enter it from the interior of the containing-cup A, which will be filled with the lubricant.

Holes may be made through the bottom 2, communicating with the valve-chamber, or the valve-stem may be sufficiently loose to allow the oil to pass through. The stem may preferably be hollow to allow air to pass through it and the valve, so as to assist in the movement of the oil whenever the lower valve is opened.

The upper end of the stem 10 has a ring or other suitable attachment, as at 13', and it is designed for the purpose of enabling the operator to reach it from the floor in case the lubricator is attached to the box of overhead line-shafting or other distant or inaccessible points, so that with a pole having a suitable hook or connection the stem and valve may be lifted. The lubricant in the upper part of the valve-chamber will then pass below the valve and through the discharge-opening 14 to the point to be lubricated.

The valve-chamber may be of a size to contain the required amount of lubricant for a specified time, and it will only be necessary to raise the valve for a moment to allow the oil which has accumulated in the interval to pass below the valve. While the valve is being held up it closes against the upper seat 8 and prevents any flow of lubricant through the valve-chamber. When it is released, the spring closes it against the lower seat and no further flow will take place, and the valve-chamber will shortly fill again with the lubricant. Thus I am enabled to regulate the amount of lubricant to any desired degree and to prevent waste which might otherwise occur.

Having thus described my invention, what I claim, and desire to secure by Letters Patent, is—

1. In a lubricator, the combination of a container including a body portion and end heads one of said heads having an aperture through it and the walls of the aperture diverging outwardly to form a valve-seat; a plate fitting against said apertured head, having the face presented thereto provided with an opening with outwardly-converging walls forming a valve-seat; a double-face valve adapted to close against either of said seats; means for connecting said lower head and plate with their openings in register; and a spring for holding the valve normally against the seat in said plate.

2. In a lubricator the combination with a container including a cylinder and upper and lower heads, said lower head having an aperture through it with walls diverging toward the outer face of the head; a plate fitting directly against said lower head and having the face presented toward the outer face of the head, provided with an opening whose walls converge oppositely to the corresponding walls of the opening in the head whereby a chamber of double conical shape is formed between the meeting faces of the head and plate; a double cone-valve adapted to seat against the inclined walls of the openings in either the head or plate; a spring normally seating the valve against the plate; and means for uniting the cylinder, the heads and the plate as a unitary structure.

In testimony whereof I have hereunto set my hand in presence of two subscribing witnesses.

HENRY P. JOSEWSKI.

Witnesses:
   HENRY P. TRICOU,
   S. H. NOURSE.